United States Patent
Lertwattanaseri et al.

(10) Patent No.: US 11,480,713 B2
(45) Date of Patent: Oct. 25, 2022

(54) OPTICAL MATERIAL WITH IMPROVED COLOUR

(71) Applicant: Essilor International, Charenton-le-Pont (FR)

(72) Inventors: Tipparat Lertwattanaseri, Bangkok (TH); Pierre Fromentin, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 141 days.

(21) Appl. No.: 16/498,041

(22) PCT Filed: Mar. 27, 2018

(86) PCT No.: PCT/EP2018/057833
§ 371 (c)(1),
(2) Date: Sep. 26, 2019

(87) PCT Pub. No.: WO2018/178112
PCT Pub. Date: Oct. 4, 2018

(65) Prior Publication Data
US 2020/0088909 A1     Mar. 19, 2020

(30) Foreign Application Priority Data

Mar. 27, 2017  (EP) .................................... 17305346

(51) Int. Cl.
| | |
|---|---|
| *G02B 1/04* | (2006.01) |
| *C08F 18/24* | (2006.01) |
| *G02C 7/02* | (2006.01) |
| *G02C 7/10* | (2006.01) |

(52) U.S. Cl.
CPC .............. *G02B 1/041* (2013.01); *C08F 18/24* (2013.01); *G02C 7/022* (2013.01); *G02C 7/108* (2013.01)

(58) Field of Classification Search
CPC ...................................................... G02B 1/041
See application file for complete search history.

(56) References Cited

U.S. PATENT DOCUMENTS

| | | | | |
|---|---|---|---|---|
| 5,644,004 | A * | 7/1997 | Sanchez ................ | C07C 409/38 522/102 |
| 5,760,149 | A * | 6/1998 | Sanchez ................ | C07C 409/38 525/313 |
| 7,214,754 | B2 | 5/2007 | Nagpal | |
| 2010/0041787 | A1 | 2/2010 | Chen | |
| 2012/0188503 | A1 * | 7/2012 | Tamura .................. | G02C 7/108 351/159.65 |
| 2012/0196951 | A1 * | 8/2012 | Mentak .................. | C08F 226/12 523/105 |
| 2016/0017218 | A1 * | 1/2016 | Kojima .................. | G02C 7/022 359/355 |

FOREIGN PATENT DOCUMENTS

| | | |
|---|---|---|
| CN | 105759455 | 7/2016 |
| JP | 2005266794 | 9/2005 |
| WO | WO 2016143899 | 9/2016 |
| WO | WO 2017047743 | 3/2017 |
| WO | WO 2017090725 | 6/2017 |
| WO | WO 2017113459 | 7/2017 |

OTHER PUBLICATIONS

International Search Report and Written Opinion for PCT/EP2018/057833 prepared by European Patent Office, dated Jun. 20, 2018.

* cited by examiner

*Primary Examiner* — Michael F Pepitone
(74) *Attorney, Agent, or Firm* — Norton Rose Fulbright US LLP

(57) ABSTRACT

Disclosed are polymerizable compositions for ophthalmic lenses. The compositions employ peroxide-based polymerization initiators with decreased capacity for dye degradation. The compositions enable the inclusion of color-balancing dyes, resulting in lenses with improved clarity and color balance.

18 Claims, 1 Drawing Sheet

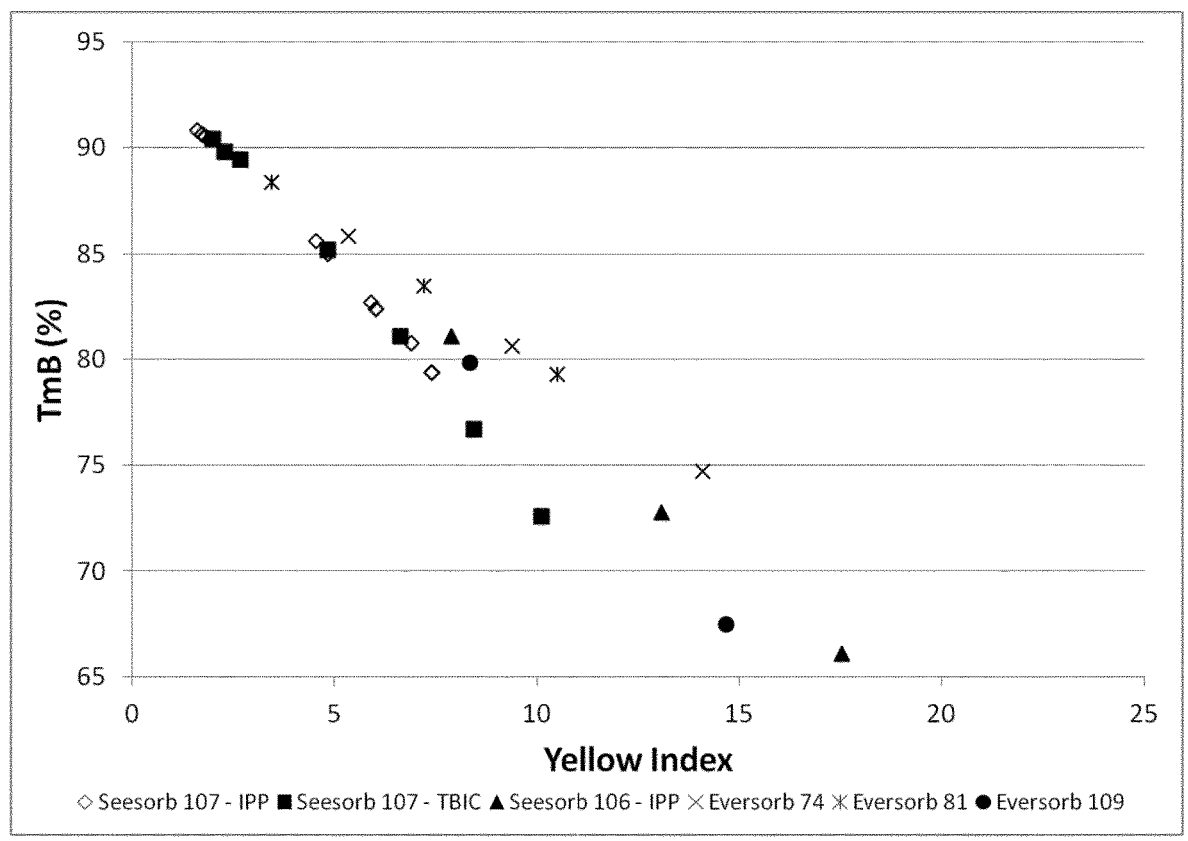

OPTICAL MATERIAL WITH IMPROVED COLOUR

CROSS-REFERENCE TO RELATED APPLICATIONS

This application is a national phase application under 35 U.S.C. § 371 of International Application No. PCT/EP2018/057833 filed 27 Mar. 2018, which claims priority to European Patent Application No. 17305346.3 filed 27 Mar. 2017. The entire contents of each of the above-referenced disclosures is specifically incorporated by reference herein without disclaimer.

FIELD OF THE INVENTION

The invention relates to the field of polymers and polymerizable compositions for ophthalmic lenses.

BACKGROUND

Sunlight contains a variety of visible and invisible light rays that can have a range of effects. Light rays of colors red, orange, yellow, green, and blue light rays, and many shades of each of these colors, in combination create "white light" or sunlight. The energy and wavelength of the individual rays varies, and there is an inverse correlation between light ray energy and wavelength. Light rays at the red end of the visible light color spectrum are low in energy and have long wavelengths. Light rays at the blue end of the color spectrum are high in energy and have short wavelengths.

Sunlight is the main source of blue light, however, man-made light sources including fluorescent lights and LED screens contribute significantly to blue light exposure. Most notably, the display screens of computers, electronic notebooks, smartphones, and other digital devices emit significant amounts of blue light. Laboratory studies have shown that too much exposure to blue light may damage light-sensitive cells in the retina. This causes changes that resemble those of macular degeneration, which can lead to permanent vision loss.

Ophthalmic lens manufacturers have implemented blue cut lenses in order to filter and reduce retinal exposure to some blue light. Incorporation of blue cut elements into an ophthalmic lens markedly increases yellowness, a property that is associated with ageing and hazy lenses. One way to reduce yellowness is to use a bluing agent as an additive, which aids in balancing the lens color to a more neutral color.

In ophthalmic lenses made from allylic substrates such as CR-39®, a polymerization initiator is used to polymerize the lens material. Traditionally-employed peroxide initiators react with additives and may degrade them. If a lens material includes a bluing dye, the initiator may degrade the dye and diminish the dye's ability to color balance the lens. Bluing pigment particles are degradation-resistant alternatives to dyes, however the solid pigment particles can diffuse light and decrease the clarity of a lens. There is a need in the industry for catalysts that do not degrade additives, and improve color of lenses without impairing their clarity.

SUMMARY

Inventors have found that substituting the traditionally-employed, relatively-reactive diisopropylpercoxycarbonate (IPP) initiator with a less-reactive peroxide polymerization initiator allows for the inclusino of color-balancing dyes with little to no risk for initiator-induced degradation. The presently disclosed polymerization initiators exhibit comparable mechanical properties, e.g. polymerization ability, to traditionally-employed initiators. Without wishing to be bound by theory, it is believed that the inclusion of a single peroxycarbonate functional group, as compared to the dual peroxycarbonate groups in traditionally-employed polymerization initiators, attenuates the dye-degrading ability of the initiator. In some embodiments, lenses employing the polymerization initiators disclosed herein may incorporate color-balancing dyes for improved optical properties including haze and yellow index.

In some embodiments, a polymerizable composition comprises at least one allyl monomer or oligomer, at least one catalyst suitable for initiating the polymerization of said allyl monomer or oligomer, at least one UV absorber, and at least one dye. In some embodiments, an allyl monomer or oligomer is a polymerizable molecule bearing at least two allyl functional groups. In some aspects, the allyl monomer is ethylene glycol bis(allyl carbonate), diethylene glycol bis(allyl carbonate), or a mixture thereof. In some embodiments, the allyl oligomer is an oligomer of diethylene glycol bis(allyl carbonate), ethylene glycol bis(allyl carbonate), or a mixture thereof. In some aspects, the polymerizable composition is used in the manufacture of an ophthalmic lens. The at least one allyl monomer or oligomer may be present in an amount ranging from 20 to 99.5% by weight, in particular from 50 to 99.5%, more particularly from 80 to 99.5%, even more particularly from 90 to 99.5% by weight, based on the total weight of the composition.

In some aspects, the at least one catalyst is of the formula $R_1$—O—O—C(=O)—O—$R_2$ (known as alkylperoxy alkyl carbonates) or $R_1$—O—O—C(=O)—$R_2$ (known as peroxyesters), where $R_1$ and $R_2$ are each independently an alkyl chain having from 1 to 12 carbon atoms or a linear or branched polyether having from 5 to 30 carbon atoms. In some embodiments, the catalyst alkyl chain or alkyl chains are saturated alkyl chains. In some embodiments, the catalyst alkyl chain has from 3 to 8 carbon atoms.

In some embodiments, the polyether is a multivalent polyether and is bound to a plurality of alkylperoxy alkyl carbonate groups or to a plurality of peroxyester groups, where $R_1$ is preferably bound to 2, 3 or 4 alkylperoxy alkyl carbonate groups or to 2, 3 or 4 peroxyester groups.

In other embodiments, the catalyst comprises a multivalent polyether $R_1$ or $R_2$ bound to a plurality of alkylperoxy carbonate groups or to a plurality of peroxyester groups, where $R_1$ or $R_2$ is preferably bound to 2, 3 or 4 alkylperoxy carbonate groups or to 2, 3 or 4 peroxyester groups. In a specific embodiment, $R_2$ is a multivalent polyether bound to 2, 3 or 4 peroxyester groups. In some embodiments, the catalyst is:

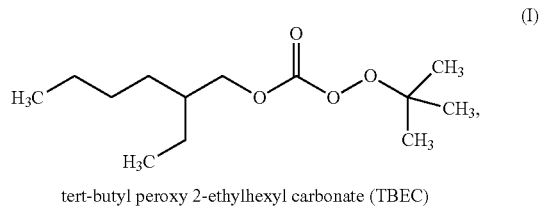

tert-butyl peroxy 2-ethylhexyl carbonate (TBEC)

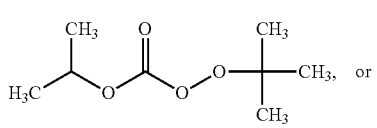

tert-butyl peroxy isopropyl carbonate
(TBIC)

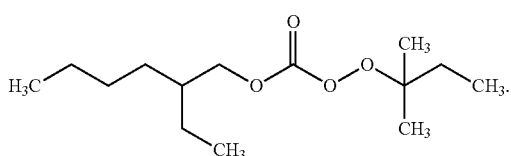

tert-amyl peroxy 2-ethylhexyl carbonate
(TAEC)

In a particular embodiment, the at least one UV-absorber is a benzotriazole, a benzophenone, a triazine, an oxalanilide, or a mixture thereof. The terms UV absorber and blue-cutting agent are used interchangably herein. In some aspects, the UV absorber is a benzophenone having the following structure:

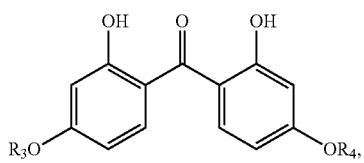

where $R_3$ and $R_4$ are each independently H or an alkyl chain having from 1 to 12 carbon atoms In some embodiments, $R_3$ and $R_4$ are each H (2,2',4,4'-tetrahydroxybenzophenone, Seesorb 106 from Shipro Kasei) or methyl (2,2'-dihydroxy-4,4'-dimethoxybenzophenone, Seesorb 107 from Shipro Kasei). In some aspects, the UV absorber is a benzotriazole absorber. Suitable benzotriazole absorbers are octyl-3-[3-tert-butyl-4-hydroxy-5-(5-chloro-2H-benzotriazole-2-yl) phenyl]propionate and/or 2-ethylhexyl-3-[3-tert-butyl-4-hydroxy-5-(5-chloro-2H-benzotriazole-2-yl)phenyl] propionate (Eversorb 109 from Everlight chemical). In some embodiments, a UV absorber is a molecule that at least partially blocks light having a wavelength ranging from 280 to 450 nm. UV light-absorbing compounds are frequently incorporated into ophthalmic lenses in order to reduce or prevent UV light from reaching the retina. The UV absorber preferably has the ability to at least partially block light having a wavelength shorter than 400 nm, preferably UV wavelengths up to 380 nm, but also has an absorption spectrum extending to the visible blue light range (380-460 nm). The UV absorber may be present in an amount ranging from 0.05 to 3%, preferably from 0.1 to 2.5%, more preferably from 0.15 to 2% of the weight of the polymerizable composition.

In some embodiments, a polymerizable composition comprises at least one dye in an amount ranging from 1 to 100 ppm (parts per million) of the polymerizable composition. The amount and/or identity of the at least one dye may be selected to balance the color of light passing through optical articles produced by the polymerizable composition. The amount and/or identity of the at least one dye may be selected to impart a color or tint to an optical article. The at least one dye may be selected from azo dyes, polymethyne dyes, arylmethyne dyes, polyene dyes, anthracinedione dyes, pyrazolone dyes, anthraquinone dyes, isoindolinone dyes, auinophtalone dyes, naphthalenediamine dyes, and carbonyl dyes. Specific examples of such dyes include those defined in Color Index, for instance, Solvent Blue 128, Solvent Red 195, and Solvent Violet 59. Some aspects of the disclosure are directed towards a method for producing an ophthalmic lens comprising polymerizing a polymerizable composition comprising at least one allyl monomer or oligomer, at least one catalyst suitable for initiating the polymerization of said allyl monomer or oligomer, at least one UV absorber, and at least one dye.

In some aspects, an ophthalmic lens is obtained by polymerizing a polymerizable composition comprising at least one allyl monomer or oligomer, at least one catalyst suitable for initiating the polymerization of said allyl monomer or oligomer, at least one UV absorber, and at least one dye. An ophthalmic lens obtained by polymerizing a polymerizable composition disclosed herein may have a yellow index of less than 5, preferably less than 4. Yellow index (YI) is a colorimetric calculation from tristimulus values (X, Y, Z) according to ASTM D1003. In some aspects, an ophthalmic lens obtained by polymerizing a polymerizable composition disclosed herein has a haze value of less than 0.5%, preferably less than 0.4%, more preferably less than 0.3%. In some aspects, an ophthalmic lens obtained by polymerizing a polymerizable composition disclosed herein has a light-cut value of less than 410 nm, preferably less than 405 nm. Light-cut is defined as the highest wavelength for which transmittance of the lens is less than or equal to 1%.

In some aspects, a polymerizable composition may comprise at least one pigment. Pigments are defined by the Color Pigment Manufacturers Association as colored, black, white or fluorescent particulate organic or inorganic solids that usually are insoluble in, and essentially physically and chemically unaffected by, the vehicle or substrate in which they are incorporated. Pigments alter appearance by selective absorption and/or by scattering of light. Pigments are usually dispersed in vehicles or substrates for application, as for instance in the manufacture or inks, paints, plastics or other polymeric materials. Pigments retain a crystal or particulate structure throughout the coloration process.

In some aspects, a polymerizable composition may comprise at least one dye. Dyes are defined by the Ecological and Toxicological Association of Dyes and Organic Pigment Manufacturers as colored or fluorescent organic molecules which impart color to a substrate by selective absorption of light. Dyes are soluble and/or go through an application process which, at least temporarily, destroys any crystal structure by absorption, solution, and mechanical retention, or by ionic or covalent chemical bonds.

In some aspects, a polymerizable composition may further comprise at least one surfactant. Surfactants are compounds that lower surface tension, and may act as detergents, wetting agents, emulsifiers, foaming agents, and dispersants. A surfactant may be non-ionic, ionic (positive or negative), or zwitterionic. In some embodiments, the surfactants are polyether-modified silicones. The polymerizable composition may include other additives, such as antioxidants, heat stabilizers, light stabilizers, and/or optical brighteners in order to produce lenses with consistent color.

"Ophthalmic lens" is a lens adapted, namely for mounting in eyeglasses, whose function is to protect the eye and/or to correct vision. This lens can be an afocal, unifocal, bifocal, trifocal, or progressive lens. The ophthalmic lens may be corrective or un-corrective. Eyeglasses wherein ophthalmic lenses will be mounted could be either a traditional frame comprising two distinctive ophthalmic lenses, one for the right eye and one for the left eye, or like mask, visor, helmet sight or goggle, wherein one ophthalmic lens faces simultaneously the right and the left eyes. Ophthalmic lenses may be produced with traditional geometry as a circle or may be produced to be fitted to an intended frame.

Haze is the percentage of transmitted light that, in passing through a specimen, deviates from the incident beam by forward scattering. Haze is measured by light transmission measurements according to ASTM D1003.00, which is incorporated herein in its entirety by reference. All references to "haze" values are measured according to this standard. Low values are a measurement of low "haze." As haze increases, loss of contrast occurs until the object cannot be seen.

A "polymerizable composition" can include a thermally-polymerizable composition, a photo-polymerizable composition, or a mixture thereof. A thermally-polymerizable composition is a composition where polymerization occurs upon exposure to an elevated temperature. A photo-polymerizable composition is a composition where polymerization occurs upon exposure to actinic radiation including, but not limited to, UV, visible, IR, microwave, etc. As used herein, polymerizing or polymerization refer to a chemical reaction that results in bonding of one or more monomers or oligomers to each other to form a polymer.

Any embodiment of any of the disclosed compositions and/or methods can consist of or consist essentially of— rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes the compositions' abilities to reduce polymerization initiator-induced degradation of dye molecules. Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

BRIEF DESCRIPTION OF THE FIGURES

FIG. 1 is a graph comparing blue cut performance to yellow index cost for a series of blue-cutting agents.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The polymerizable compositions disclosed herein employ a polymerizable initiator with a decreased capacity for dye degradation over traditionally-employed allyl monomer polymerization initiators, e.g., IPP. The disclosed initiators preserve effectiveness at catalyzing polymerization while exhibiting little to no degradation of dyes. The disclosed polymerizable compositions therefore enable the use of color-balancing dyes with minimized risk for dye degradation.

The term "saturated" as used herein means the compound or group so modified has no carbon-carbon double and no carbon-carbon triple bonds, except as noted below. The term does not preclude carbon-heteroatom multiple bonds, for example a carbon oxygen double bond or a carbon nitrogen double bond. Moreover, it does not preclude a carbon-carbon double bond that may occur as part of keto-enol tautomerism or imine/enamine tautomerism. Aliphatic compounds/groups can be saturated, that is joined by single bonds (alkanes/alkyl), or unsaturated, with one or more double bonds (alkenes/alkenyl) or with one or more triple bonds (alkynes/alkynyl).

The term "alkyl" when used without the "substituted" modifier refers to a monovalent saturated aliphatic group with a carbon atom as the point of attachment, a linear or branched, cyclo, cyclic or acyclic structure, and no atoms other than carbon and hydrogen. Thus, as used herein cycloalkyl is a subset of alkyl. The groups —$CH_3$ (Me), —$CH_2CH_3$ (Et), —$CH_2CH_2CH_3$ (n-Pr), —$CH(CH_3)_2$ (iso-Pr), —$CH(CH_2)_2$ (cyclopropyl), —$CH_2CH_2CH_2CH_3$ (n-Bu), —CH(CH$_3$)CH$_2$CH$_3$ (sec-butyl), —CH$_2$CH(CH$_3$)$_2$ (iso-butyl), —C(CH$_3$)$_3$ (tert-butyl), —CH$_2$C(CH$_3$)$_3$ (neo-pentyl), —CH$_2$CH(C$_2$H$_5$)CH$_2$CH$_2$CH$_2$CH$_3$ (2-ethylhexyl), cyclobutyl, cyclopentyl, cyclohexyl, and cyclohexylmethyl are non-limiting examples of alkyl groups. The term "polyether" refers to a functional group having two or more oxygen atoms (poly), wherein each oxygen atom is bound to two alkyl carbons (ether). In some embodiments, a polyether may be obtained by polymerization of a polyol with two or more alkylene oxides. Polyethers may be linear or branched. Non-limiting examples of polyether groups are polymers or copolymers of ethylene oxide, propylene oxide and butylene oxide. Other suitable polyethers groups are obtained by reaction of a polyol with ethylene oxide, propylene oxide, butylene oxide or mixtures thereof. Non limiting examples of polyol are trimethylolpropane, pentaerythritol. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —OCH$_2$CH$_2$OH, —C(O)CH$_3$, —NC(O)CH$_3$, —N(CH$_3$)$_2$, —C(O)NH$_2$, —OC(O)CH$_3$, —S(O)$_2$NH$_2$, or imidazolidinone. The following groups are non-limiting examples of substituted alkyl groups: —CH$_2$OH, —CH$_2$Cl, —CF$_3$, —CH$_2$CN, —CH$_2$C(O)OH, —CH$_2$C(O)OCH$_3$, —CH$_2$C(O)NH$_2$, —CH$_2$C(O)CH$_3$, —CH$_2$OCH$_3$, —CH$_2$OC(O)CH$_3$, —CH$_2$NH$_2$, —CH$_2$N(CH$_3$)$_2$, and —CH$_2$CH$_2$Cl.

Examples

Preparation of Polymerization Compositions

The polymerizable compositions described below included at least one allyl monomer, a blue-cutting agent, and at least one color-balancing material in combination with a peroxide initiator. Additional additives were included in some examples.

The polymerizable compositions were produced by weighing and mixing the ingredients in a beaker. CR39® (allyl monomer 1), optional CR39E® (allyl monomer 2, as disclosed in U.S. Pat. No. 7,214,754), and optional surfactant were first mixed. Once homogeneous, a blue-cutting agent was then added and the beaker contents were mixed again until the blue-cutting agent was completely dissolved. Color balancing materials (C.I. Pigment violet 15, BL-1, or a combination of dyes (Solvent Red 195/Solvent Blue 128 or Solvent Violet 56/Solvent Blue 128) were then introduced. Finally, initiator (IPP or TBIC) was added and the mixture was stirred thoroughly, degassed, and filtered.

TABLE 1

Polymerizable Composition Preparation

| Example | I-1 | I-2 | I-3 | C-4 | C-5 | I-6 |
|---|---|---|---|---|---|---|
| CR-39 (allyl monomer 1) | 99.2 | 94.2 | 92.2 | 94.5 | 94.5 | 94.2 |
| CR-39 E (allyl monomer 2) | | | | 2.0 | 2.0 | |
| KF-353A (releasing agent) | 0.1 | 0.1 | 0.1 | | | 0.1 |
| Seesorb 107 (UV absorber) | 0.3 | 0.3 | 0.3 | 0.3 | 0.3 | 0.3 |
| TBIC (initiator) | 0.4 | 0.4 | 0.4 | | | 0.4 |
| IPP (control initiator) | | | | 3.21 | 3.21 | |
| Solvent Violet 59 (Color-balancing dye, 0.01% in CR-39) | | | | | | 1.5 |
| Solvent Red 195 (Color-balancing dye, 0.01% in CR-39) | | 2.5 | 3.5 | | | |
| Solvent Blue 128 (Color-balancing dye, 0.01% in CR-39) | | 2.5 | 3.5 | | | 3.5 |
| BL-1 (Color-balancing pigment, 1% in CR-39) | | | | 1.5 | | |
| Total | 100 | 100 | 100 | 100 | 100 | 100 |

Casting and Polymerization

Molds were filled with polymerizable compositions using a cleaned syringe. The polymerization was carried out in a regulated electronic oven in which the temperature was gradually increased from 45° C. to 130° C. in 15 hours then kept constant at 130° C. for 6 hours.

Lens Characterization

The following parameters were measured (all on piano lenses having 2 mm thickness center):

1. Light-cut: highest wavelength for which transmittance is lower than 1%
2. Blue cut: measured through the average transmittance TmB of the ophthalmic lens over the range 420-450 nm
3. Yellow index (YI): colorimetric calculation from tristimulus values (X, Y, Z) according to ASTM D1003 standard
4. Haze: mesured using Hazeguard XL-211, according to ASTM D1003-00

Results

Examples C-4 and C-5 employed diisopropyl peroxydicarbonate (IPP), a relatively reactive polymerization initiator which has been shown to degrade dyes and negatively affect color balance and lens clarity. As depicted in Table 2, Example 4-C exhibits high haze, which results from bluing pigment-induced light scattering.

TABLE 2

Results

| Example | I-1 | I-2 | I-3 | C-4 | C-5 | I-6 |
|---|---|---|---|---|---|---|
| Light-Cut (nm) | 402 | 402 | 402 | 404 | 403 | 402 |
| TvD65 (%) | 92.03 | 89.57 | 88.93 | 88.59 | 92.0 | 87.9 |
| YI | 4.84 | 3.61 | 3.01 | 3.30 | 6.6 | 2.35 |
| L* | 96.78 | 95.80 | 95.54 | 95.40 | 96.8 | 95.14 |
| a* | −2.06 | −1.85 | −1.79 | −2.56 | −2.8 | −2.03 |
| b* | 4.13 | 3.35 | 2.99 | 3.63 | 5.6 | 2.77 |
| Haze (%) | 0.19 | 0.21 | 0.19 | 0.61 | 0.1 | 0.30 |
| TmB (%) | 85.16 | 83.94 | 83.85 | 81.42 | 81.2 | 83.08 |

In order to eliminate IPP-induced degradation of color-balancing additives or pigment-induced light scattering, Example C-5 contained no coloring materials. Due to the lack of a color-balancing material, Example C-5 exhibited yellow index (YI) that was significantly higher than other examples.

Example I-1 included the initiator TBIC, a blue-cutting agent (Seesorb 107), and no bluing agents. The blue-cutting agent was used to reach a TmB of 85%. Example 1-1 exhibited a low haze value of 0.19%, however, yellow index was high at 4.8, owing to a lack of bluing agents. By contrast, Example C-4 employed a color-balancing pigment and exhibited a relatively low yellow index of 3.3, but a high haze value of 0.61%.

Example I-2 included the initiator TBIC, a blue-cutting agent, and bluing agents. As demonstrated in Table 2, Example 1-2 exhibited a low yellow index of 3.61, owing to the inclusion of color-balancing bluing agents. Importantly, Example I-2 exhibited a low haze value of 0.21%. Despite the inclusion of color balancing dye molecules, which may be degraded by harsh polymerization initiators, Example I-2 demonstrated low haze. The relatively mild polymerization initiators disclosed herein allow for the use of color balancing dyes to provide lenses exhibiting a superior combination of low haze and low yellow index. Examples I-3 and I-6 demonstrate comparable results using other color-balancing dyes: a good balance between low haze and yellow index.

A number of blue-cutting agents were evaluated for blue-cutting performance versus yellow index, without color-balancing agents. As depicted in FIG. 1 (obtained with IPP or TBIC initiator) the blue-cutting agent Seesorb 107, a benzophenone, demonstrated the lowest TmB (a measure of blue-cut performance) at the lowest yellow index cost. Eversorb 109 and Seesorb 106 demonstrated a good balance between TmB and Yellow Index, as compared to standard UV absorbers such as Seesorb 709 or Tinogard TL, which were not able to provide TmB values below 85%. Other UV absorbers such as Eversorb 74 or Eversorb 81 (both benzotriazole type) were able to provide low TmB values (lower than 85%) but with much higher Yellow Index. Lens Examples I-2, I-3, and I-6 employed the best-performing UV absorbers and color-balancing agents, along with the presently-claimed catalysts.

In summary, the relatively mild polymerization initiators disclosed herein exhibit reduced degradation of color-balancing dyes. The polymization initiators allow for the use of blue-cutting agents in combination with color-balancing dyes to provide lenses exhibiting a superior combination of blue cut performance, low haze, and low yellow index.

The claims are not to be interpreted as including means-plus- or step-plus-function limitations, unless such a limitation is explicitly recited in a given claim using the phrase(s) "means for" or "step for," respectively.

The invention claimed is:

1. A polymerizable composition comprising:
   a) at least one allyl monomer or oligomer;
   b) at least one catalyst suitable for initiating the polymerization of said allyl monomer or oligomer;
   c) at least one UV absorber; and
   d) at least one dye;
   wherein the at least one catalyst has the following formula:

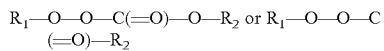

wherein $R_1$ is an alkyl chain having from 1 to 12 carbon atoms and $R_2$ is a multivalent polyether bound to a plurality of alkylperoxy carbonate groups; or wherein $R_2$ is an alkyl chain having from 1 to 12 carbon atoms and $R_1$ is a multivalent polyether bound to a plurality of alkylperoxy carbonate groups.

2. The polymerizable composition of claim 1, wherein the allyl monomer or oligomer is ethylene glycol bis(allyl carbonate) or diethylene glycol bis(allyl carbonate), or an oligomer thereof, or a mixture thereof.

3. The polymerizable composition of claim 1, wherein the at least one allyl monomer or oligomer is present in an amount ranging from 20 to 99.5% by weight, based on a total weight of the composition.

4. The polymerizable composition of claim 1, wherein the catalyst $R_1$ and $R_2$ groups are saturated.

5. The polymerizable composition of claim 1, wherein the catalyst alkyl chain comprises 3 to 8 carbon atoms.

6. The polymerizable composition of claim 1, wherein the UV absorber is a benzophenone having the following structure:

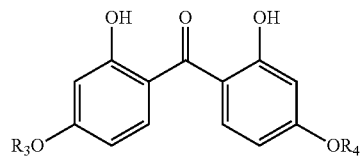

wherein $R_3$ and $R_4$ are each independently H or an alkyl chain having from 1 to 12 carbon atoms.

7. The polymerizable composition of claim 6, wherein $R_3$ and $R_4$ are methyl.

8. The polymerizable composition of claim 6, wherein $R_3$ and $R_4$ are H.

9. The polymerizable composition of claim 1, wherein $R_1$ or $R_2$ is bound to 2, 3 or 4 alkylperoxy carbonate groups.

10. A process for the manufacture of an ophthalmic lens, comprising polymerizing the polymerizable composition of claim 1 to form an ophthalmic lens.

11. An ophthalmic lens obtained by polymerizing a polymerizable composition comprising:
    a) at least one allyl monomer or oligomer;
    b) at least one catalyst suitable for initiating the polymerization of said allyl monomer or oligomer;
    c) at least one UV absorber; and
    d) at least one dye;
    wherein the at least one catalyst has the following formula:

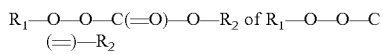

wherein $R_1$ is an alkyl chain having from 1 to 12 carbon atoms and $R_2$ is a multivalent polyether bound to a plurality of alkylperoxy carbonate groups; or wherein $R_2$ is an alkyl chain having from 1 to 12 carbon atoms and $R_1$ is a multivalent polyether bound to a plurality of alkylperoxy carbonate groups.

12. The ophthalmic lens of claim 11, wherein the lens has a yellow index of less than 5.

13. The ophthalmic lens of claim 11, wherein the lens has a haze value of less than 0.5%.

14. The ophthalmic lens of claim 11, wherein the lens has a light-cut value of less than 410 nm.

15. The ophthalmic lens of claim 11, wherein $R_1$ or $R_2$ is bound to 2, 3 or 4 alkylperoxy carbonate groups.

16. The polymerizable composition of claim 1, wherein said polyether has from 5 to 30 carbon atoms.

17. The polymerizable composition of claim 1, wherein the at least one allyl monomer or oligomer is present in an amount ranging from 50 to 99.5% by weight, based on a total weight of the composition.

18. The polymerizable composition of claim 1, wherein the at least one allyl monomer or oligomer is present in an amount ranging from 80 to 99.5% by weight, based on a total weight of the composition.

* * * * *